United States Patent [19]

Yoshida et al.

[11] Patent Number: 4,670,490
[45] Date of Patent: Jun. 2, 1987

[54] VINYL CHLORIDE RESIN COMPOSITION

[75] Inventors: Tatsuro Yoshida, Namerikawa; Hidematsu Shimasaki, Uozu; Takahisa Minamizono, Uozu; Katsura Ochi, Uozu, all of Japan

[73] Assignee: Nippon Carbide Kogyo Kabushiki Kaisha, Tokyo, Japan

[21] Appl. No.: 591,332

[22] Filed: Mar. 19, 1984

[30] Foreign Application Priority Data

Jun. 22, 1983 [JP] Japan ................................. 58-111001

[51] Int. Cl.$^4$ ................................................. C08K 5/49
[52] U.S. Cl. ..................................... 524/115; 524/155; 524/321; 524/523; 524/569; 525/227
[58] Field of Search ............... 524/523, 569, 115, 155, 524/321; 525/227

[56] References Cited

U.S. PATENT DOCUMENTS

| | | | |
|---|---|---|---|
| 2,392,857 | 1/1946 | McGill | 524/523 |
| 3,012,001 | 12/1961 | Smith | 524/523 |
| 3,277,042 | 10/1966 | Richart | 524/523 |
| 3,418,274 | 12/1968 | Caplan et al. | 524/523 |
| 3,662,028 | 5/1972 | Wineland et al. | 525/227 |
| 3,723,369 | 3/1973 | Lutz, Jr. et al. | 524/569 |
| 3,833,686 | 9/1974 | Grochowski et al. | 525/227 |
| 3,867,481 | 2/1975 | Whang | 525/227 |
| 4,209,437 | 6/1980 | Fischer | 524/569 |

FOREIGN PATENT DOCUMENTS 58-39828  3/1983  Japan ................................. 524/523

Primary Examiner—Joseph L. Schofer
Assistant Examiner—N. Sarofim

[57] ABSTRACT

A vinyl chloride resin composition with a yield stress of 1 to 5 g/mm$^2$, composed of (A) 100 parts by weight of a vinyl chloride resin containing 0 to about 20% by weight of a comonomer, (B) about 10 to about 80 parts by weight, per 100 parts by weight of the resin (A), of (B-1) a liquid polyester plasticizer having a number average molecular weight ($\overline{M}n$) of not less than about 1,500 and 0 to about 10 parts by weight, per 100 parts by weight of the resin (A), of (B-2) a plasticizer for the resin (A), which is other than said plasticizer (B-1), and (C) about 0.2 to about 200% by weight, based on the total weight of said plasticizers (B-1) and (B-2), of a low-molecular-weight acrylic or methacrylic resin having a number average molecular weight ($\overline{M}n$) of about 1,500 to about 50,000 and being solid at 23° C.

11 Claims, No Drawings

VINYL CHLORIDE RESIN COMPOSITION

This invention relates to a vinyl chloride resin composition in the form of molding materials such as a powder, granules or pellets which is suitable for production of films such as marking films, overlaying films and laminating films, sheets and the like (to be generically referred to as films in the present application). The invention also relates to a vinyl chloride resin composition in the form of shaped articles derived from the aforesaid molding materials. In particular, the vinyl chloride resin composition of the invention exhibits excellent properties as molding materials for production of marking films, and as marking films derived from these molding materials.

Specifically, this invention relates to an improved semihard vinyl resin composition in the form of molding materials or shaped articles, which has good pliability with moderate stiffness represented by its yield stress of 1 to 5 kg/mm$^2$, a good retention of the adhesion strength of a pressure-sensitive adhesive layer that may be provided on the composition in the form of a film, a good adhesion of the composition in film form to printing ink which may be applied thereto, good weatherability, good resistance to whitening by water, and a good retention of an ultraviolet absorber.

More specifically, this invention relates to a vinyl chloride resin composition with a yield stress of 1 to 5 kg/mm$^2$ composed of (A) 100 parts by weight of a vinyl chloride resin containing 0 to about 20% by weight of a comonomer, (B) about 10 to about 80 parts by weight, per 100 parts by weight of the resin (A), of (B-1) a liquid polyester plasticizer having a number average molecular weight ($\overline{Mn}$) of not less than about 1,500 and 0 to about 10 parts by weight, per 100 parts by weight of the resin (A), of (B-2) a plasticizer for the resin (A), which is other than said plasticizer (B-1), and (C) about 0.2 to about 200% by weight, based on the total weight of said plasticizers (B-1) and (B-2), of a low-molecular-weight acrylic or methacrylic resin having a number average molecular weight ($\overline{Mn}$) of about 1,500 to about 50,000 and being solid at 23° C.

Vinyl chloride resins have heretofore been known in varying degrees of plasticization ranging from soft vinyl chloride resins plasticized with liquid plasticizers to non-plasticized hard vinyl chloride resins, and have found extensive use in various applications as resins which show a wide range of properties ranging from rubbery property to rigidity depending upon the degree of plasticization.

It is known to blend vinyl chloride resins with an acrylic or methacrylic resin in order mainly to improve their processability during shaping, and efforts have been made to provide vinyl resin compositions suitable for intended uses of vinyl chloride resins.

Soft to semihard vinyl chloride resin compositions normally have relatively large contents of plasticizers, and involve troubles which are directly or indirectly attributed to the bleed out of the plasticizers and also undergo deterioration in the properties of the vinyl chloride resins. Attempts have heretofore been made also to overcome such troubles, but have not resulted in the provisions of satisfactory vinyl chloride resin compositions.

For example, Japanese Laid-Open Pat. Publication No. 112956/1979 proposes a soft vinyl chloride resin composition in the form of molding materials suitable for production of vinyl leathers, shoe soles, waterproof canvases, vinyl paints, gloves, printing rolls, dolls, toys, etc., and shaped articles derived from these molding materials. Specifically, this patent document discloses a soft vinyl chloride resin composition comprising a vinyl chloride resin, a plasticizer, and 0.1 to 20% by weight, based on the plastitizer, of a homo- or co-oligomer having a number average monomer unit chain length of 3 to 150 and a glass transition temperature of not more than 30° C. and containing at least 60% by weight of monomeric units of the formula

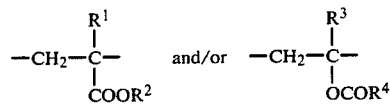

wherein $R^1$ and $R^3$ represent a hydrogen atom or a hydrocarbon group, and $R^2$ and $R^4$ represent a hydrogen atom, a hydrocarbon group or a hydrocarbon group having a hydroxyl group.

In this proposal, the aforesaid acrylic or methacrylic oligomer having a number average molecular weight ($\overline{Mn}$) of 300 to 15,000 and a glass transition temperature of not more than 30° C. and being liquid at 23° C. is incorporated in an amount of 0.1 to 20% by weight based on the plasticizer in order to inhibit deterioration of the properties of the vinyl chloride resin which is caused by the blending of the liquid plasticizer and to eliminate the troubles of the bleedout of the plasticizer. In the above-proposed soft vinyl chloride resin composition, the use of the acrylic or methacrylic oligomer liquid at 23° C. is essential. Moreover, this patent document does not refer to the use of the composition as a marking film. Furthermore, the soft vinyl chloride resin composition disclosed in this patent document has a yield stress of zero, and does not show pliability with moderate stiffness which is required of marking films. The patent document further lists up a wide range of plasticizers for vinyl chloride resins, including polyester plasticizers, but no actual example of using a polyester plasticizer is shown. The Examples in this patent document show the use of only DOP (dioctyl phthalate), DBP (dibutyl phthalate) and TCP (tricresyl phosphate).

The present inventors have made investigations in order to develop a semihard vinyl chloride resin composition, particularly a semihard vinyl chloride resin composition having excellent properties in the form of molding materials or shaped articles such as marking films.

These investigations have led to the discovery that a semihard vinyl resin composition in the form of molding materials or shaped articles, which has good pliability with moderate stiffness, a good retention of the adhesion strength of a pressure-sensitive adhesive layer that may be provided on the composition in the form of a film, a good adhesion of the composition in film form to printing ink which may be applied thereto, good weatherability, good resistance to whitening by water, and a good retention of an ultraviolet absorber, particularly the excellent properties desired of marking films, can be provided by combining 100 parts by weight of the vinyl chloride resin (A), about 10 to about 80 parts by weight of a liquid polyester plasticizer (B-1) having the specified number average molecular weight ($\overline{Mn}$) shown above optionally in combination with up to about 10 parts by weight of another plasticizer (B-2) for the vinyl chloride resin (A), and about 0.2 to about 200% by weight, based on the total weight of the plasticizers (B-1) and (B-2), of the low-molecular-weight acrylic or methacrylic resin (C) having the specified number average molecular weight ($\overline{M}n$) and being solid at 23° C. and by limiting the yield stress of the composition to 1 to 5 kg/mm.

Marking films have gained widespread acceptance as decorative or displaying stripe stickers in vehicles such as bicycles and four-wheeled vehicles, sailing vessels such as yachts and boats, containers for land and marine transportations, furniture, building materials such as door plates, window frames, and pillars; advertisement stickers for displaying letters, figures and patterns for advertisement on signboards and display panels, and various display stickers such as traffic marks, road marks, guide panels, danger warning marks and commodity labels.

Such a marking film is comprised of a film, a suitable presssure-sensitive adhesive layer on one surface thereof, and a suitable releasing sheet on the adhesive layer. In use, the releasing sheet is removed, and the adhesive layer is applied to the desired site of a substrate. Conventional marking films, however, have the defect that the plasticizer in the films bleeds out onto the adhesive layer to reduce its adhesive strength with time. The plasticizer in the films bleeds out also onto that surface which is opposite to the adhesive layer, and deteriorates its weatherability. Consequently, dust and dirt in the air adhere to that surface to contaminate it easily. When printing is applied to the surface of a conventional marking film, the adhesion of the printing ink to the film surface is insufficient, and tends to drop off. It is the usual practice, on the other hand, to incorporate an ultraviolet absorber into marking films because they are frequently used outdoors. With conventional marking films, the ultraviolet absorber tends to volatilize by heat during film formation, and such films after formation have a poor retention of the ultraviolet absorber.

Usually, the amounts of plasticizers are relatively large in soft to semihard vinyl chloride resin compositions. With the marking films in particular, the deterioration in properties is caused owing to, or in relation to, the bleed out of the plasticizers. Furthermore, in order to adhere such a marking film properly to the desired site of a substrate, for example to a curved surface, it is necessary to impart pliability with moderate stiffness. It has been extremely difficult, however, to provide a vinyl chloride resin composition which contains an amount of a plasticizer required of a soft to semihard vinyl chloride resin, overcomes the troubles attributed either directly or indirectly to the bleed out of the plasticizer, and has pliability with moderate stiffness shown by a specified yield stress.

Investigations of the present inventors have led to the discovery that the above difficulties can be overcome, and a semihard vinyl chloride resin composition in the form of a molding material particularly for marking films or in the form of a shaped article having excellent improved properties can be provided, by combining 100 plarts by weight of the vinyl chloride resin (A), about 10 to about 80 parts by weight of the liquid polyester plasticizer (B-1) having the number average molecular weight ($\overline{M}n$) specified above optionally together with up to about 10 parts by weight of the other plasticizer (B-2) for the vinyl chloride resin (A), and about 0.2 to about 200% by weight, based on the total weight of the plasticizers (B-1) and (B-2), of the low-molecular-weight acrylic or methacrylic resin (C) having the specified number average molecular weight ($\overline{M}n$) and being solid at 23° C., and by limiting the yield stress of the resulting composition to 1 to 5 kg/mm$^2$.

It is an object of this invention therefore to provide a semihard vinyl chloride resin having various improved properties, particularly in the form of a molding material for marking films and in the form of a marking film derived therefrom.

The above and other objects and advantages of this invention will become more apparent from the following description.

When the semihard vinyl chloride resin composition of this invention is to be molded into a film, there is no restriction on the method of molding. It may be carried out, for example, by heat molding techniques such as extrusion or calendering, a so-called solution casting method comprising dissolving the composition in a solvent such as tetrahydrofuran or methyl ethyl ketone, casting the solution and drying it to a film, or a sol casting method comprising dispersing the solids components of the composition in the state of a sol, and casting the sol, followed by heat-melting.

In the present invention, a semi-sol casting method is used especially preferably. This method comprises dissolving the composition in a solvent capable of dissolving the solid acrylic or methacrylic acid and the plasticizer at room temperature but incapable of dissolving the vinyl chloride resin at room temperature to form a sol composed of the vinyl chloride resin particles dispersed in a solution of the acrylic or methacrylic resin, casting the sol, and heat-curing it to form a film.

Generally, films produced by casting methods have less distortion than those produced by heat-molding methods, and are preferred in this respect.

The semi-sol, as referred to hereinabove, means a mixture of a solution of the acrylic or methacrylic resin in the solvent capable of dissolving the acrylic or methacrylic resin but substantially incapable of dissolving the vinyl chloride resin, with a sol composed of the vinyl chloride resin and/or both the vinyl chloride resin and the liquid plasticizer.

There is no particular restriction on the vinyl chloride resin (A) used in the semihard vinyl chloride resin composition of this invention, and any vinyl chloride resins which have heretofore been utilized in molding can be used properly. For example, there can be used vinyl chloride resins having a degree of polymerization of about 600 to about 3,000, preferably about 700 to about 2,000, more preferably about 800 to about 1,800, especially preferably about 1,200 to about 1,600. The vinyl chloride resin (A) may also be a resin for vinyl chloride pastes. The use of paste resins in the sol casting method and the semi-sol casting method is especially preferred in this invention. Preferred paste resins have such a particle size that they can disperse stably in the plasticizer (B) composed of (B-1) and (B-2) to show smooth flowability, have high affinity for the plasticizer (B) for easy penetration of the plasticizer into the center of the resin particles (A), and can uniformly and rapidly melt upon heating. For example, these paste resins have a particle size of 0.1 to 10 microns, preferably 0.1 to 7 microns, and an average particle diameter of 2 to 3 microns. Relatively coarse particles of vinyl chloride resin having a particle diameter of 10 to 100 microns can be incorporated in order to reduce the viscosity of the sol and reduce the cost of production.

The vinyl chloride resin (A) may be a vinyl chloride homopolymer, and a copolymer of vinyl chloride with up to about 20% by weight, preferably up to about 10% by weight, especially preferably up to about 6% by weight, of a comonomer.

Examples of the comonomer include olefins such as ethylene, propylene, butylene and isobutylene; dienes such as butadiene, chlorobutadiene and pentadiene; vinyl or vinylidene halides other than vinyl chloride, such as vinyl fluoride, vinylidene chloride and vinyl bromide; acrylic or methacrylic acid esters such as ethyl acrylate, butyl acrylate, 2-hydroxyethyl acrylate, 2-ethylhexyl acrylate, methyl methacrylate, butyl methacrylate, propyl methacrylate and ethylene glycol dimethacrylate; vinyl esters such as vinyl acetate, vinyl chloroacetate, vinyl propionate and vinyl laurate; vinyl ethers such as methyl vinyl ether, propyl vinyl ether, butyl vinyl ether, phenyl vinyl ether and allyl vinyl ether; and styrene and its derivatives such as dimethylstyrene, vinylstyrene, chlorostyrene and vinylphenol. One or more of these comonomers may be used.

The vinyl chloride resin (A) can be produced by methods known per se or are commercially available under tradenames Nikavinyl SG-700, SG-800, SG-1100, SG-1300 and SG-1400 (vinyl chloride resins manufactured by Nippon Carbide Kogyo K. K.), Zeon 121, 131, 25 and 135J (vinyl chloride resins manufactured by Nihon Zeon Co., Ltd.), Vinika 51ME, P-440 and P-400 (vinyl chloride resins manufactured by Mitsubishi-Monsanto Co., Ltd.), and Sumilit PX (a vinyl chloride resin manufactured by Sumitomo Chemical Co., Ltd.).

The plasticizer (B) used in the semihard vinyl chloride resin composition of this invention is composed of about 10 to about 80 parts by weight, preferably about 20 to about 60 parts by weight, more preferably about 25 to about 50 parts by weight, of the polyester plasticizer (B-1) having a number average molecular weight ($\overline{Mn}$) of at least about 1,500, preferably about 1,500 to about 6,000, more preferably about 1,500 to about 4,000, especially preferably about 2,000 to about 4,000, and 0 to about 5 parts by weight of the other plasticizer (B-2) for vinyl chloride resins per 100 parts by weight of the vinyl chloride resin (A).

The liquid polyester plasticizer (B-1) may, for example, include those derived from $C_4$–$C_{15}$ dibasic acids and $C_2$–$C_{20}$ glycols. Specific examples include those obtained by reacting 1 to 3 dibasic acids having 4 to 15 carbon atoms such as maleic acid, adipic acid, phthalic acid, azelaic acid and sebacic acid and 1 to 5 glycols having 2 to 20 carbon atoms such as ethylene glycol, 1,2-propylene glycol, 1,3-butylene glycol, 1,4-butanediol, neopentyl glycol, dipropyl glycol, 1,6-hexanediol, 2,2,4-trimethyl-1,3-pentanediol and 1,5-pentanediol, and a chain stopper selected from acetic acid, coconut oil fatty acid, n-octanol and n-decanol. The term "liquid" qualifying the polyester plasticizer in this invention means that the polyester plasticizer is a viscous liquid having a viscosity, determined at 25° C. by a BH-type rotary viscometer, of not more than 500,000 poises. The number average molecular weight ($\overline{Mn}$) of the polyester plasticizer is determined by the gel-permeation chromatographic method.

The liquid polyester plasticizer is commercially available, and commercially available products can be used in this invention. Examples include PN-150, PN-260 and PN-446 (polyester plasticizers manufactured by Adeka-Argus Chemical Co., Ltd.), NS-3700 (polyester plasticizer manufactured by Dainichi Seika Kogyo K. K.), P-204N and P-29 (polyester plasticizers manufactured by Dainippon Ink and Chemicals Co., Inc.), G-25 and G-40 (polyester plasticizers manufactured by Rohm & Haas Co.), Sp-171, DIDA, SP-501 and SP-115S (polyester plasticizers manufactured by Sanken Chemical Industry Co., Ltd.), Kodaflex NP-10 (polyester plasticizer manufactured by Eastman Chemical Products Co.), Flexol R-2H (polyester plasticizer manufactured by Union Carbide Corporation), Edenol 1200 (polyester plasticizer manufactured by Henkel Co.), and Rheoplex 100, Rheoplex 110 and Rheoplex 220 (polyester plasticizers manufactured by Ciba-Geigy Co.). These polyester plasticizers may be used singly or in combination.

Together with the polyester plasticizer (B-1), up to about 10 parts by weight, preferably up to about 5 parts by weight, of the other plasticizer (B-2) for vinyl chloride resins may be used per 100 parts by weight of the vinyl chloride resin (A). Examples of the other plasticizer (B-2) are $C_1$–$C_{35}$ mono- or polyhydric alcohol esters of $C_2$–$C_{35}$ mono- or poly-basic carboxylic acids, chlorinated paraffin, and epoxy compounds having an oxirane oxygen content of 2 to 9% and a molecular weight of not more than 2000, for example 10 to 2000. Specific examples of the plasticizer (B-2) include $C_1$–$C_{35}$ mono- or poly-hydric alcohol esters of phthalic acid such as dimethyl phthalate, diethyl phthalate, dibutyl phthalate, di-(2-ethylhexyl) phthalate, di-n-octyl phthalate, higher alcohol phthalates, diisooctyl phthalate, diisobutyl phthalate, dipentyl phthalate, diisodecyl phthalate, ditridecyl phthalate, diundecyl phthalate, di(heptylnonylundecyl) phthalate, benzyl phthalate, butylbenzyl phthalate, dinonyl phthalate, di-n-alkyl phthalates and di-n- or iso-alkyl phthalates; $C_1$–$C_{35}$ mono- or poly-hydric alcohol esters of isophthalic acid such as dimethyl isophthalate, di-(2-ethylhexyl) isophthalate, diisooctyl isophthalate and higher alcohol isophthalates; $C_1$–$C_{35}$ mono- or poly-hydric alcohol esters of tetrahydrophthalic acid such as di-(2-ethylhexyl) tetrahydrophthalate, di-n-octyl tetrahydrophthalate, diisodecyl tetrahydrophthalate, $C_7$–$C_{10}$ alkyl tetrahydrophthalates and higher alcohol tetrahydrophthalates; $C_1$–$C_{35}$ mono- or poly-alcohol esters of adipic acid such as di-n-butyl adipate, di-(2-ethylhexyl) adipate, diisodecyl adipate, benzyloctyl adipate and di-(butoxyethoxyethyl) adipate; $C_1$–$C_{35}$ mono- or poly-hydric alcohol esters of azelaic acid such as di-(2ethylhexyl) azelate, diisooctyl azelate and di-2-ethylhexyl-4-thioazelate; $C_1$–$C_{35}$ mono- or poly-hydric alcohol esters of sebacic acid such as di-n-butyl sebacate and di-(2-ethylhexyl) sebacate; $C_1$–$C_{35}$ mono- or poly-hydric alcohol esters of maleic acid such as di-nbutyl maleate, dimethyl maleate and diethyl maleate; $C_1$–$C_{35}$ mono- or poly-hydric alcohol esters of fumaric acid such as di-n-butyl fumarate and di-(2-ethylhexyl) fumarate; $C_1$–$C_{35}$ mono- or poly-hydric alcohol esters of trimellitic acid such as tri-(2-ethylhexyl) trimellitate, tri-n-octyl trimellitate and triisodecyl trimellitate; $C_1$–$C_{35}$ mono- or poly-hydric alcohol esters of citric acid such as triethyl citrate, tri-n-butyl citrate and acetyltriethyl citrate; $C_1$–$C_{35}$ mono- or poly-hydric alcohol esters of itaconic acid such as monomethyl itaconate, monobutyl itaconate and dimethyl itaconate; $C_1$–$C_{35}$ mono- or poly-hydric alcohol esters of oleic acid such as butyl oleate, tetrahydrofurfuryl oleate and glyceryl monooleate; $C_1$–$C_{35}$ mono- or poly-hydric alcohol esters of ricinoleic acid such as methylacetyl ricinolate, butylacetyl ricinolate and glyceryl monoricinolate; $C_1$–$C_{35}$ mono- or poly-hydric alcohol esters of stearic acid such as n-butyl stearate, glyceryl monostearate and diethylene glycol; and other compounds, such as diethylene glycol monolaurate, benzenesulfonebutyramide, trimethyl phosphate, tributoxyethyl phosphate, tetra2-ethylhexyl pyromellitate, diethylene glycol dibenzoate, glycerol monoacetate, chlorinated paraffin, and epoxy derivatives having an oxirane oxygen content of 2 to 9% and a molecular weight of not more than 1000.

In addition to the vinyl chloride resin (A) and the liquid polyester plasticizer (B-1), the semihard vinyl chloride resin composition of this invention also include as an essential component the low-molecular-weight acrylic or methacrylic resin (C) having a number average molecular weight ($\overline{Mn}$) of about 1,500 to about 50,000, preferably about 2,000 to about 40,000, more preferably about 2,500 to about 30,000, and being solid at 23° C. in an amount of about 0.2 to about 200% by weight, preferably about 10 to about 150% by weight, more preferably about 20 to about 100% by weight, based on the total amount of the plasticizers (B-1) and (B-2).

Any low-molecular-weight acrylic or methacrylic resin having the aforesaid number average molecular weight ($\overline{M}$) and being solid at 23° C. can be used as the resin (C). Preferably, the acrylic or methacrylic resin is a homopolymer or copolymer composed of at least one alkyl acrylate or methacrylate selected from the group consisting of $C_1$–$C_{18}$ alkyl esters of acrylic acid and $C_1$–$C_{18}$ alkyl esters of methacrylic acid with or without another comonomer component, which has the above-specified number average molecular weight and is solid at 23° C.

Specific examples of the aforesaid acrylates or methacrylates include acrylates such as methyl acrylate, ethyl acrylate, n-propyl acrylate, iso-propyl acrylate, n-butyl acrylate, iso-butyl acrylate, cyclohexyl acrylate, 2-ethylhexyl acrylate, stearyl acrylate, methoxyethyl acrylate, ethoxyethyl acrylate, butoxyethyl acrylate, methoxypolyethylene glycol acrylate, 2-hydroxyethyl acrylate, 2-hydroxypropyl acrylate, 2-hydroxy-3-chloropropyl acrylate, dimethylaminoethyl acrylate, diethylaminoethyl acrylate, glycidyl acrylate, 2-chloroethyl acrylate, 2,3-dibromopropyl acrylate, tribromophenyl acrylate, allyl acrylate, oleyl acrylate, epoxystearyl acrylate, polyethylene glycol diacrylate, hexaneglycol diacrylate, neopentyl glycol diacrylate, dipropylene glycol diacrylate, trimethylolpropane triacrylate, tetramethylolmethane triacrylate, 2-methyl-3-sulfopropyl acrylamide, calcium diacrylate, magnesium diacrylate, barium diacrylate, zinc diacrylate, aluminum triacrylate, lead diacrylate, and sodium acrylate; methacrylates such as methyl methacrylate, ethyl methacrylate, propyl methacrylate, isopropyl methacrylate, n-butyl methacrylate, isobutyl methacrylate, tertiary butyl methacrylate, cyclohexyl methacrylate, octyl methacrylate, 2-ethylhexyl methacrylate, lauryl methacrylate, stearyl methacrylate, methoxyethyl methacrylate, ethoxyethyl methacrylate, butoxyethyl methacrylate, methoxypolyethylene glycol methacrylate, 2-hydroxyethyl methacrylate, 2-hydroxypropyl methacrylate, 2-hydroxy-3-chloropropyl methacrylate, polypropylene glycol monomethacrylate, dimethylaminoethyl methacrylate, diethylaminoethyl methacrylate, glycidyl methacrylate, tetrahydrofurfuryl methacrylate, 2-chloroethyl methacrylate, allyl. methacrylate, oleyl methacrylate, epoxystearyl methacrylate, ethylene glycol dimethacrylate, polyethylene glycol dimethacrylate, butylene glycol dimethacrylate, hexaneglycol dimethacrylate, neopentyl glycol dimethacrylate, polypropylene glycol dimethacrylate, and trimethylolpropane trimethacrylate.

These monomers can be copolymerized under atmospheric or elevated pressure by using polymerization methods generally known in the art, for example by a bulk, suspension or solution polymerization method. The bulk polymerization and solution polymerization are preferred for synthesis of low-molecular-weight resins, the latter being especially preferred in view of its operability. Alcohols, ether esters, ketones, aromatics, and aromatic petroleum naphthas may be used as solvents in the solution polymerization.

The low-molecular-weight acrylic or methacrylic resin (C) used in this invention may further contain another comonomer component. The content of the comonomer component may be properly varied within such a range that the acrylic or methacrylic resin (C) meets the above-specified number average molecular weight. For example, it is not more than about 100 parts, preferably not more than about 60 parts by weight, per 100 parts by weight of the acrylic or methacrylic acid ester.

Examples of the other comonomer component (or modifying monomer) are olefins having 2 to 6 carbon atoms such as ethylene, propylene, butylene, isobutylene and 4-methyl-1-pentene, dienes such as butadiene, chlorobutadiene and pentadiene; vinyl esters such as vinyl acetate, vinyl chloroacetate, vinyl propionate and vinyl laurate; vinyl or vinylidene halides such as vinyl chloride and vinylidene chloride; vinyl ethers such a methyl vinyl ether, propyl vinyl ether, butyl vinyl ether and phenyl vinyl ether; styrene monomers such as styrene, methylstyrene, dimethylstyrene and vinylphenol; ethylenically unsaturated monomers having a carboxyl group such as maleic acid, fumaric acid, crotonic cid, acrylic acid, methacrylic acid, and itaconic acid; and other acrylic monomers such as acryloyl chloride, acrylonitrile, acrylamide and N-tert-butylacrylamide.

In addition, the component (C) used in this invention conveniently has a glass transition temperature (Tg) of at least 30° C., preferably at least 35° C.

The glass transition temperature (Tg) is measured and determined by the method described at pages 11 to 35 of "Dynamical Properties of Polymers" written by L. E. Nielsen and translated by Nobuharu Onoki (Apr. 15, 1965 published by Kagaku Dojin-Sha). The glass transition temperature of a copolymer is determined by the method described at pages 26 to 27 of the above publication.

Specifically, the Tg of the copolymer is calculated in accordance with the following equation.

$$\frac{1}{Tg} = \frac{W_1}{Tg_1} + \frac{W_2}{Tg_2} + \ldots + \frac{W_n}{Tg_n}$$

(Provided $W_1 + W_2 + \ldots W_n = 1$)

In the above equation, Tg is the glass transition temperature of the copolymer (in absolute temperature). $Tg_1$, $Tg_2$, ... and $Tg_n$ respectively represent the glass transition temperatures (in absolute temperatures) of pure homopolymers 1, 2 ... and n derived from the individual monomer components 1, 2 ..., and n. $W_1$, $W_2$, ... and $W_n$ are the weight fractions respectively of the individual components constituting the copolymer.

The Tg (°K) of a homopolymer of each of the monomer components is known, and shown, for example, in Table A. The Tg of a resin derived from MMA-BMA-BA (60% by weight-30% by weight-10% by weight) is calculated as 325° K by utilizing Table A.

TABLE A $$\frac{0.6}{376} + \frac{0.3}{294} + \frac{0.1}{216} = \frac{1}{Tg}$$

| Monomer | Monomer symbol | Tg, °K. |
|---|---|---|
| Methyl acrylate | MA | 273 |
| Ethyl acrylate | EA | 246 |
| n-Butyl acrylate | n-BA | 216 |
| t-Butyl acrylate | t-BA | 304 |
| 2-Ethylhexyl acrylate | 2EHA | 213 |
| 2-Hydroxyethyl acrylate | 2HEA | 273 |
| Octyl acrylate | OA | 208 |
| Acrylic acid | AA | 439 |
| Acrylamide | AAMD | 426 |
| Methyl methacrylate | MMA | 376 |
| Ethyl acrylate | EMA | 320 |
| n-Butyl acrylate | n-BMA | 294 |
| 2-Hydroxyethyl acrylate | 2HEMA | 328 |
| Methacrylic acid | MAA | 458 |
| Vinyl acetate | VAc | 306 |
| Propyl acetate | VPr | 266 |
| Styrene | St | 363 |
| Acrylonitrile | AN | 379 |
| Vinyl chloride | VCl | 353 |
| Vinylidene chloride | VdCl | 258 |
| Ethylene | Et | 196 |
| Butadiene | Bd | 183 |
| Vinyl Versatate | VV | 270 |

As stated in detail hereinabove, the resin composition of this invention is a vinyl chloride resin composition with a yield stress of 1 to 5 kg/mm², preferably 1.2 to 4 kg/mm², composed of (A) 100 parts by weight of a vinyl chloride resin containing 0 to about 20% by weight, preferably 0 to about 10% by weight, more preferably 0 to about 6% by weight, of a comonomer, (B) about 10 to about 80 parts by weight, preferably about 20 to about 60 parts by weight, more preferably about 25 to about 50 parts by weight, per 100 parts by weight of the resin (A), of (B-1) a liquid polyester plasticizer having a number average molecular weight ($\overline{Mn}$) of not less than about 1,500, preferably about 1,500 to about 6,000, more preferably about 1,500 to about 4,000 and especially preferably about 2,000 to about 4,000 and 0 to about 10 parts by weight, preferably 0 to about 5 parts by weight, per 100 parts by weight of the resin (A), of (B-2) a plasticizer for the resin (A), which is other than said plasticizer (B-1), and (C) about 0.2 to about 200% by weight, preferably about 10 to about 150% by weight, more preferably about 20 to about 100% by weight, based on the total weight of said plasticizers (B-1) and (B-2), of a low-molecular-weight acrylic or methacrylic resin having a number average molecular weight ($\overline{Mn}$) of about 1,500 to about 50,000, preferably about 2,000 to about 40,000, more preferably about 2,500 to about 30,000 and being solid at 23° C.

By meeting the aforesaid combination requirements, the composition of this invention, has good pliability with moderate stiffness, a good retention of the adhesion strength of a pressure-sensitive adhesive layer that may be provided on the composition in the form of a film, a good adhesion of the composition in film form to printing ink which may be applied thereto, good weatherability, good resistance to whitening by water, and a good retention of an ultraviolet absorber.

It is presumed that the components (A), (B) and (C) affect each other to provide the aforesaid excellent properties of the composition of this invention. It is difficult to generalize the action of each of the combination parameters, but as experimentally shown by many Examples and Comparative Examples given hereinafter, when the composition of this invention falls outside the ranges of the combination requirements specified hereinabove, it is extremely difficult in practice to achieve the aforesaid excellent properties simultaneously in the composition of this invention.

The amount of the comonomer component which may be included in the vinyl chloride resin (A) is up to about 20% by weight, preferably up to about 10% by weight, and more preferably up to about 6% by weight. If the amount of the comonomer component exceeds the aforesaid upper limit, disadvantages, such as the reduction of heat stability, the coloration of films, or the marked increase of the viscosity of the paste sol, tend to result. Accordingly, it is used in an amount of not more than about 20% by weight.

The degree of polymerization of the vinyl chloride resin (A) can be properly selected. As stated hereinabove, it is preferably about 600 to about 3,000, more preferably about 700 to about 2,000, still more preferably about 800 to about 1,800, especially preferably about 800 to about 1,600. By utillizing the resin (A) having such a preferred degree of polymerization, the viscosity of a paste sol during preparation varies little with time, and uniform melting and gellation become possible. Conveniently, therefore, vinyl chloride resins (A) having the degree of polymerization exemplified above are used.

The number average molecular weight of the polyester plasticizer (B-1) is at least about 1,500, preferably about 1,500 to about 6,000, more preferably about 1,500 to about 4,000, especially preferably 2,000 to 4,000. If it is lower than the above-specified lower limit, the tendency of the bleed out of the plasticizer undesirably increases in the resin composition composed of (A), (C) and (B), and its adhesion retention, weatherability and ultraviolet absorber retention are unneglibibly deteriorated. On the other hand, when it is too high, for example about 8,000, the polyester plasticizer turns solid from its liquid state. Hence, the elongation of a film decreases and it becomes undesirably brittle. Accordingly, the liquid polyester plasticizer (B-1) to be used should have a number average molecular weight of at least 1,500, preferably about 1,500 to about 6,000.

The amount of the liquid polyester plasticizer (B-1) used is about 10 to about 80 parts by weight, preferably about 20 to about 60 parts by weight, per 100 parts by weight of the vinyl chloride resin (A). If the amount of the liquid polyester plasticizer (B-1) is smaller than the specified lower limit, the moderate pliability of a film prepared from the resulting composition composed of (A), (B) and (C) tends to be lost. When it exceeds the upper limit specified, the resulting composition has a reduced retention of adhesion strength, and the adhesion of printing ink to a film prepared from the composition and its weatherability and ultraviolet absorber retention are deteriorated. Accordingly, the above-specified amount should be used.

The amount of the other plasticizer (B-2) which may be used in combination with the liquid polyester plasticizer (B-1) is up to about 10 parts by weight per 100 parts by weight of the vinyl chloride resin (A). If this amount exceeds about 10 parts by weight, bleed out of the plasticizer increases, and the resulting composition undergoes deterioration in adhesion strength retention, printing ink adhesion, weatherability and ultraviolet absorber retention.

Furthermore, if the number average molecular weight of the low-molecular-weight acrylic or methacrylic resin being solid at 23° C. is too low outside the range of about 1,500 to about 50,000, preferably about 2,000 to about 40,000, the plasticizer (B) has a marked tendency to bleed out, and an unnegligible deterioration in adhesion strength retention and weatherability occurs, in relation to the other requirements (A) and (B), especially the latter. Furthermore, the low-molecular-weight acrylic or methacrylic resin (C) itself tends to bleed out, and this tendency is greater with low-molecular-weight acrylic or methacrylic resins which are liquid at 23° C. to cause whitening of a film surface. This accelerates deterioration of adhesion strength retention and weatherability and causes inconvenience to the retention of an ultraviolet absorber. If the number average molecular weight of the acrylic or methacrylic resin is higher than the above-specified upper limit, the moderate pliability of a film prepared from the resulting composition is impaired, and in relation to the other requirements (A) and (B), the resulting film tends to lose the advantage of pliability with moderate stiffness. Furthermore, when the resulting resin is to be molded into a film structure by, for example, the sol casting or semisol casting method using a paste resin as the vinyl chloride resin (A), the dispersibility or solubility of the low-molecular-weight acrylic or methacrylic resin (C) tends to be reduced. Accordingly, the low-molecular-weight acrylic or methacrylic resin (C) should have a number average molecular weight within the above-specified range and be solid at 23° C.

The amount of the low-molecular-weight acrylic or methacrylic resin is about 0.2 to about 200% by weight, preferably about 10 to about 150% by weight, based on the total weight of the plasticizer (B). If the amount of the acrylic or methacrylic resin (C) is smaller than the specified lower limit, the action of the component (C) to inhibit bleed out of the plasticizer (B) becomes insufficient in relation to the other requirements. Furthermore, the retention of an ultraviolet absorber is also deteriorated. If, on the other hand, it is larger than the specified upper limit, the moderate pliability of a film prepared from the resulting composition having the other requirements tends to be impaired. Hence, the amount of the low-molecular-weight acrylic or methacrylic resin (C) should be selected within the above-specified range.

The semihard vinyl chloride resin composition of this invention is composed of the components (A), (B) and (C) with the aforesaid combination requirements and has a yield stress of 1 to 5 kg/mm$^2$, preferably 1.2 to 4 kg/mm$^2$. Ordinary soft vinyl chloride resin compositions containing relatively large amounts of liquid plasticizers which have a yield stress of zero or nearly zero do not show pliability with moderate stiffness. If the yield stress is lower than the above-specified lower limit, it is difficult to apply a film prepared from the resulting composition to a given site of the film in a given size because the film stretches. Thus, the appearance of the applied film is poor. If, on the other hand, the yield stress is higher than the above-specified upper limit, the film does not conform well to a curved site of the substrate, but undergoes creasing cannot be applied uniformly. Accordingly, the yield stress within the above-specified range should be properly selected.

The semihard vinyl chloride resin composition of this invention may contain various other additives such as coloring agents, metal powders, powders obtained by crushing metal foils, lubricants, stabilizers, antihaze agents, ultraviolet absorbers, antioxidants, antistatic agents, fire retardants, blowing agents, and compatible resins.

Examples of the coloring agents include inorganic pigments such as titanium oxide, zinc oxide, lead white, calcium carbonate, gypsum, precipitated silica, carbon black, red iron oxide, molybdenum red, cadmium yellow, yellow lead, titanium yellow, chromium oxide green and ultramarine; and organic pigments such as Permanent Red 4R, Hansa Yellow 10G, Benzidine Yellow GR, Permanet Carmine FB, Phthalocyanine Blue B and Phthalocyanine Green. The amount of such a coloring agent is not particularly restricted, and may be properly selected. For example, it is about 0.01 to about 150 parts by weight per 100 parts by weight of the vinyl chloride resin (A).

Examples of the metal powders and metal foil powders include foil powders or pulverized materials of aluminum, brass, stainless steel, lead, iron, etc., mica, and bronze powder. There is no particular restriction on the amount of such a powder, and can be properly selected. For example, it is about 1 to about 50 parts by weight.

The lubricants may be any known lubricants for vinyl chloride resins. Examples include hydrocarbons such as liquid paraffin and polyethylene wax, fatty acids such as stearic acid and hydroxyfatty acids, fatty acid amides, esters of fatty acids and alcohols, aliphatic alcohols, and polyhydric alcohols. The amount of such a lubricant can also be properly selected, and is, for example, about 0.1 to about 10 parts by weight per 100 parts by weight of the vinyl chloride resin (A). Use of lubricants tends to promote the dimensional stability of a film prepared from the composition of this invention after application to a substrate, and frequently gives favorable results.

Examples of the stabilizers include calcium stearate, barium stearate, lead stearate, basic lead sulfite, dibasic lead phosphite, dibutyltin dilaurate, dibutyltin dimaleate, dibutyltin mercaptide, dioctyltin maleate-type stabilizers, dioctyltin laurate-type stabilizers, dioctyltin mercapto-type stabilizers, and stannane diol derivatives. The amount of such a stabilizer can be properly selected, and is, for example, not more than about 10 parts by weight per 100 parts by weight of the vinyl chloride resin (A).

Examples of the antihaze agents are nonionic surface-active agents such as polyoxyethylene glycerin monostearate. The amount of such an antihaze agent can also be properly chosen, and is, for example, up to about 10 parts by weight per 100 parts by weight of the vinyl chloride resin (A).

Examples of the ultraviolet absorbers include hydroquinones such as hydroquinone and hydroquinone disalicylate; salicylates such as phenyl salicylate and para-octylphenyl salicylate; benzophenones such as 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, 2,2'-dihydroxy-4,4'-dimethoxybenzophenone, 2-hydroxy-4-benzoyloxybenzophenone, 2,2'-hydroxy-4-methoxybenzophenone, 2-hydroxy-4-methoxy-5-sulfonebenzophenone, 2,2',4,4'-tetrahydroxybenzophenone, 2,2'-hydroxy-4,4'-dimethoxy-5-sodiumsulfobenzophenone, 4-dodecyloxy-2-hydroxybenzophenone and 2-hydroxy-5-chlorobenzophenone; benzotriazoles such as 2-(2'-hydroxy-5'-methylphenyl)benzotriazole, 2-(2'-hydroxy-5'-methylphenyl)-5-butoxycarbonylbenzotriazole, 2-(2'-hydroxy-5'-methylphenyl)-5,6-dichlorobenzotriazole, 2-(2'-hydroxy-5'-methylphenyl)-5-ethylsulfonebenzotriazole, 2-(2'-hydroxy-5'-tert. butylphenyl)-5-chlorobenzotriazole, 2-(2'-hydroxy-5'-tert. butylphenyl)benzotriazole, 2-(2'-hydroxy-5'-amylphenyl)-benzotriazole, 2-(2'-hydroxy-3',5'-dimethylphenyl)benzotriazole, 2-(2'-hydroxy-3',5'-dimethylphenyl)-5-methoxybenzotriazole, 2-(2'-methyl-4'-hydroxyphenyl)benzotriazole, 2-(2'-stearyloxy-3',5'-dimethylphenyl)-5-methylbenzotriazole, 2-(2'-hydroxy-5-carboxylphenyl)-benzotriazole ethyl ester, 2-(2'-hydroxy-3'-methyl-5'-tert. butylphenyl)-benzotriazole, 2-(2'-hydroxy-3',5'-di-tert. butyl phenyl)-5-chlorobenzotriazole, 2-(2'-hydroxy-5'-methoxyphenyl)-benzotriazole, 2-(2'-hydroxy-5'-phenylphenyl)-5-chlorobenzotriazole, 2-(2'-hydroxy-5'-cyclohexylphenyl)benzotriazole, 2-(2'-hydroxy-5-cyclohexylphenyl)benzotriazole, 2-(2'-hydroxy-5-cyclohexylphenylbenzotriazole, 2-(2'-hydroxy-4',5'-dimethylphenyl)-5-carboxybenzotriazole butyl ester, 2-(2'-hydroxy-3',5'-dichlorophenyl)benzotriazole, 2-(2'-hydroxy-4',5'-dichlorophenyl)benzotriazole, 2-(2'-hydroxy-3',5'-dimethylphenyl)-5-ethylsulfone benzotriazole, 2-(2'-hydroxy-5'-phenylphenyl)-benzotriazole, 2-(2'-hydroxy-4'-octoxyphenyl)benzotriazole, 2-(2'-hydroxy-5'-methoxyphenyl)-5-methylbenzotriazole, 2-(2'-hydroxy-5'-methylphenyl)-5-ethoxycarbonylbenzotriazole, 2-(2'-acetoxy-5'-methylphenyl)benzotriazole, 2-(2'-hydroxy-3',5'-di-tert. butylphenyl)-5-chlorobenzotriazole, and 2-(2'-hydroxy-3'-tert. butyl-5'-methylphenyl)-5-chlorobenzotriazole; substituted acrylonitriles such as 2-ethylhexyl-2-cyano-3,3-diphenylacrylate; and hexamethylphosphoric triamide. Preferred ultraviolet absorbers are such benzotriazoles as 2-(2'-hydroxy-5'-methylphenyl)benzotriazole and 2-(2'-hydroxy3'-t-butyl-5'-methylphenyl)-5-chlorobenzotriazole; such benzophenones as 2-hydroxy-4-methoxybenzophenone and 2-hydroxy-4-n-octoxybenzophenone, such salicylic acid derivatives as p-octylphenyl salicylate and phenyl salicylate; such substituted acrylonitriles as 2-ethylhexyl-2-cyano-3,3-diphenylacrylate; and hexamethylphosphoric triamide.

The use of liquid ultraviolet absorbers in this invention is a preferred embodiment. The amount of such an ultraviolet absorber may be properly chosen, and is, for example, about 0.1 to about 10 parts by weight per 100 parts by weight of the vinyl chloride resin (A).

Examples of the antioxidants are phenol derivatives such as di-t-butyl-p-cresol, amines such as N-phenyl-N'-cyclohexyl p-phenylenediamine and phenyl alphanaphthylamine, derivatives of such amines, and benzimidazole. The amount of such an antioxidant can be properly chosen, and is, for example, about 0.1 to about 5 parts by weight, per 100 parts by weight of the vinyl chloride resin (A).

Examples of the blowing agents include azodicarbonamide, azobisisobutyronitrile, N,N'-dinitrosopentamethylenetetramine, p-toluenesulfonyl hydrazide, and p,p-hydroxybis(benzenesulfonyl hydrazide). There is no particular restriction on the amount of such a blowing agent, and for example, it is about 0.2 to about 15 parts by weight per 100 parts by weight of the vinyl chloride resin (A).

Examples of the antistatic agent include polyoxyethylene alkylamines, polyoxyethylene alkylamines, polyoxyethyene alkyl ethers, glycerin fatty acid esters, sorbitan fatty acid esters, alkyl sulfonates, alkyl benzenesufonates, alkyl sulfates, alkyl phosphates, quaternary ammonium chloride, and quaternary ammonium sulfate. The amount of such an antistatic agent is not particularly limited, and can be properly chosen. For example, it is about 0.2 to about 10 parts by weight per 100 parts by weight of the vinyl chloride resin (A).

Examples of the fire retardants include phosphoric acid esters such as tributyl phosphate and diphenyloctyl phosphate; halogen-containing phosphoric acid esters such as tris(2,3-dibromopropyl) phosphate and tris(-bromochloropropyl) phosphate; halogen compounds such as diphenyl chloride and tetrabromobenzene; and antimony compounds such as antimony trioxide and triphenylstibine. The amount of such a fire retardant is not particularly restricted, and can be suitably selected. For example, it is up to about 20 parts by weight per 100 parts by weight of the vinyl chloride resin (A).

An ethylene/vinyl acetate copolymer may be cited as an example of the compatible resin. The amount of such a resin is, for example, 0 to 35 parts by weight per 100 parts by weight of the vinyl chloride resin (A).

The semihard vinyl chloride resin composition of this invention may be in the form of molded articles produced by techniques known per se. For example, it may be in the form of films (including sheets) and other molded articles known in the field of semihard vinyl chloride resins. They can be advantageously used as the marking films described above and films for lamination to plywoods, metal plates, metal foils, paper and cloths. It shows especially outstanding performance as marking films.

Molding techniques are known per se, and can be properly selected. For example, the essential components (A), (B) and (C) and as required, the above-exemplified additives are mixed by using suitable mixing means such as a ribbon blender, a Henschel mixer, a pony mill or a Disper. As required, the mixture is kneaded under heat by utilizing a suitable kneading means such as a kneading roll, a Bunbury mixer and an extruder. Examples of the molding techniques are calendering, extrusion, injection molding, casting and sol casting.

For production of marking films for which the composition of this invention is most suitable, casting, sol casting and semisol casting methods are preferred, and the semisol casting method is especially preferred.

When the semisol casting method is used, a vinyl chloride paste resin is used as the vinyl chloride resin (A), and the vinyl chloride resin (A), the plasticizer (B), the low-molecular-weight acrylic or methacrylic resin (C), a suitable solvent and as desired, suitable additives exemplified above are mixed with stirring to form a paste-like vinyl chloride paste resin composition. The paste resin composition freely flows only by gravity without the need to exert any special external stress and gives a desired shape. The sol of the desired shape is gelled by simply heat-melting it. The heat-melting may be carried out, for example at a temperature of about 160° to about 220° C. for about 2 to about 10 minutes. The sol casting method offers the advantage that an expensive large-sized molding machine is not necessary and the heat history of the resin is little. The use of a solvent is desirable in order to reduce the viscosity of the paste sol properly to the desired flowability in the sol casting method. Examples of the solvent include alcohols such as isopropanol, butanol and hexanol; esters such as ethyl acetate, butyl acetate, isobutyl acetate and butyl propionate; ether esters such as ethylene glycol monomethyl ether acetate, ethylene glycol monoethyl ether acetate, and ethylene glycol monobutyl ether acetate; ketones such as methyl ethyl ketone, methyl isobutyl ketone, cyclohexanone and methoxy methyl pentanone; hydrocarbons such as benzene, xylene, aromatic petroleum naphtha, mineral spirits, solvent naphtha, hexane and heptane; and ethers such as propylene glycol monomethyl ether, ethylene glycol monobutyl ether, ethylene glycol monobutyl ether and dioxane.

Examples of suitable solvents which are used in the semisol casting method include hydrocarbons such as benzene, toluene, xylene, ethylbenzene, isopropylbenzene, and cyclohexane; esters such as methyl acetate, ethyl acetate, butyl acetate, isobutyl acetate and butyl propionate; ether esters such as ethylene glycol monomethyl ether acetate, ethylene glycol monoethyl ether acetate and diethylene glycol monoethyl ether acetate; ethers such as ethylene glycol monoethyl ether, ethylene glycol monobutyl ether and dioxane; ketones such as acetone, methyl ethyl ketone, methyl isobutyl ketone, diisobutyl ketone, isopropyl ketone, ethyl n-butyl ketone, isophorone and cyclohexanone; halogenated hydrocarbons such as chloroform, methylchloroform, epichlorohydrin and trichloroethylene; and furanes such as tetrahydrofurane and tetrahydrofurfuryl alcohol. These solvents may be used singly or in combination. Surface-active agents may be used instead of, or together with, the above-exemplified solvents. Examples of such surface-active agents include anionic surface-active agents such as Triton X-45 (a tradename for alkylallyl polyether alcohol series), alkyl ether carboxylic acid salts, alkylbenzenesulfonic acid salts, alpha-olefinsulfonic acid salts, higher alcohol sulfate ester salts, alkyl ether sulfuric acid salts, polyoxyethylene alkyl phenyl ether sulfuric acid salts and alkylphosphoric acid ester salts; cationic surface-active agents such as aliphatic amine salts, aliphatic quaternary ammonium salts, benzalkonium salts, pyridinium salts, and imidazolinium salts; amphoteric surface-active agents such as carboxybetaines, aminocarboxylic acid salts and imidazolinium betaine; nonionic surface-active agents such as polyoxyethylene alkyl ethers, polyoxyethylene secondary alcohol ether, polyoxyethylene polyoxypropylene block copolymer, polyoxyethylene glycerin fatty acid esters, polyethylene glycol fatty acid esters, fatty acid monoglycerides, fatty acid alkanolamides, polyoxyethylene alkylamines and sorbitan fatty acid esters; and phosphate ester-type emulsifiers such as Cafac PE-510 (a tradename for a product of Toho Chemical Industry Co., Ltd.).

The following Examples and Comparative Examples illustrate the present invention more specifically. In the following examples, the yield stress, elongation, adhesion strength retention, printing ink adhesion, weatherability and ultraviolet absorber retention were measured and evaluated by the following methods.

(1) Yield stress

A sample for tensile testing was cut off from a sample film in accordance with JIS K-6734. The sample was subjected to a tensile test by a tensile tester at a tensile speed of 200 m/min. in an environment kept at a temperature of 23°±2° C. and a relative humidity of 65±5%. The tensile elongation of the sample increased with an increase in the tensile load. The load (kg) at a point (yield point) when no further increase in tensile load was noted with respect to the tensile elongation was divided by the width (mm)×thickness (mm) of the sample before testing, and the quotient is defined as the yield stress (kg/mm$^2$).

(2) Elongation

The elongated length of the sample at breakage in the above tensile testing (1) was divided by the initial length of the sample before testing, and the quotient is defined as break elongation (%).

(3) Adhesive strength retention

An acrylic adhesive (Nissetsu PE-121, a tradename for a product of Nippon Carbide Kogyo K. K.) was coated to a thickness of 30 microns to one surface of a sample film having a thickness of 50 microns. A silicone-coated releasing paper was laminated to the coated surface. The resulting sample was heat-treated for 336 hours in an oven adjusted to 80°±2° C., and then left to stand at room temperature for 24 hours. A test piece having a width of 25 mm and a length of 200 mm was cut off from the heat-treated sample, and the releasing paper was removed. The test sample was then applied by means of a 2 kg press-bonding roll on that surface of a SUS 304 stainless steel plate which had been abraded with #280 emery paper.

After application, the sample was left for 24 hours at a temperature of 23°±2° C. and a relative humidity of 65±5%. Then, one end of the test piece in the longitudinal direction was held, and the test piece was peeled off at a peeling speed of 300 m/min. in the direction (180° direction) of its end opposite to the held end, and the force required to peel it off was measured and designated as adhesion strength a (kg/cm). The adhesion strength b (kg/cm) of the same sample as above except that it was not heat-treated was measured in the same way as above. The adhesion strength retention was calculated in accordance with the following equation.

$$\text{Adhesion strength retention (\%)} = \frac{a}{b} \times 100$$

(4) Printing ink adhesion

Printing was applied through a 200-mesh printing screen made of polyester monofilaments on the non-coated surface of the same sample as that used in test (3) above using a priting ink (LOV-7810 Black manufactured by Seiko Advance Co., Ltd.) on a screen printing press (Minomat 600L, a tradename for a product of Mino Group). The printed sample was dried for 30 minutes in an oven adjusted to 50°±3° C. One hundred crosscuts at intervals of 1 mm were formed on the printed surface of the sample by using a crosshatch cutter (Model 295/I, a product of Erichsen Company), and a pressure-adhesive tape was applied to the crosscut portion. The tape was peeled off forcibly, and the peeled state of the printing ink was visually observed from the film surface. The number of crosscuts which were peeled off out of 100 crosscuts was counted, and the results were evaluated ont the following standard.

| Standard (grade) | Number of peeled crosscuts out of 100 crosscuts |
| --- | --- |
| 10 | 0 |
| 9 | 1–10 |

| Standard (grade) | Number of peeled crosscuts out of 100 crosscuts |
| --- | --- |
| 8 | 11–20 |
| 7 | 21–30 |
| 6 | 31–40 |
| 5 | 41–50 |
| 4 | 51–60 |
| 3 | 61–70 |
| 2 | 71–80 |
| 1 | 81–100 |

(5) Weatherability

A film sample was applied to a 1 mm thick aluminum plate, and exposed outdoors while it was directed southward at 45°. After one year outdoor exposure, the surface condition of the film was observed, and evaluated on the following standard.

| Standard (grade) | Surface condition |
| --- | --- |
| 5 | No soiling nor discoloration on the film surface |
| 4 | Some soiling on the film surface, but could be wiped off. No discoloration observed. |
| 3 | Some soiling on the film surface. After wiping, stains slightly remained. Some discoloration observed. |
| 2 | Noticeable soiling on the film surface. After wiping, some stain remained. Significant discoloration observed. |
| 1 | Marked soiling on the film surface. After wiping, most of the soiling remained as a stain. Marked discoloration observed. |

(6) Ultraviolet absorber retention

The ultraviolet light characteristic curve of a tetrahydrofuran solution of an ultraviolet absorber in a known concentration was measured by a spectrophotometer (UV-365 manufactured by Shimazdu Seisakusho Co., Ltd.), and a calibration curve of the rate of ultraviolet absorption and the transmittance was obtained on the basis of the transmittance at 310 nm.

A film sample was dissolved in tetrahydrofuran and the transmittance at 310 nm of the solution was measured in the same way as above by a spectrophotometer, and the concentration of the ultraviolet absorber was determined from the calibration curve.

On the other hand, the theoretical concentration of the ultraviolet absorber was determined on the basis of the blending recipe, and the retention (%) of the ultraviolet absorber was calculated from the ratio of the concentration of the ultraviolet absorber in the film to its theoretical concentration.

(7) Whitening by water absorption (resistance to whitening by water)

A sample sheet was immersed for 60 minutes in water at 80° C., and its whitening by water absorption was examined. The whitening by water absorption was evaluated by visual observation and by measuring the light transmittance at 500 nm by using a spectrophotometer.

The standard of evaluation by visual observation was as follows:

| Point | State of the sample sheet |
| --- | --- |
| 5 | Slightly whitened, but has a transparent feel. |
| 4 | Slightly whitened. |
| 3 | Whitened. |
| 2 | In a complete whitely turbid state. |
| 1 | Partly dissolved |

EXAMPLES 1 TO 9 AND COMPARATIVE EXAMPLES 1 TO 9

In each run, a composition composed of a vinyl chloride resin (Zeon 121, a product of Nihon Zeon Co., Ltd., average degree of polymerization about 1500), each of the polyester plasticizers shown in Table 1 and each of the acrylic or methacrylic resins shown in Table 2 in the amounts indicated in Table 4-a, and per 100 parts by weight of the vinyl chloride resin, 2 parts by weight of a tin-type stabilizer (TM-181FSJ, a product of Katuta Chemical Industry Co., Ltd.), 1.5 parts by weight of a Ba/Zn type stabilizer (AP-539, a product of Adeka-Argus Chemical Co., Ltd.), 0.2 part by weight of an ester-type lubricant (Bu-St; a product of Kawaken Fine Chemicals Co., Ltd.), 2 parts by weight of a benzotriazole-type ultraviolet absorber (Tinuvin P, a product of Ciba-Geigy) and 10 parts by weight of a solvent (mineral spirit, a product of Shell Chemical Co.) was kneaded at room temperature for 30 minutes in an Ishikawa-type mixing and grinding machine. Forty parts by weight of an additional supply of the solvent was added to the kneaded composition, and the mixture was stirred at room temperature for 10 minutes to obtain a sol. The sol was coated by means of a #46 wire bar on paper coated with a silicone resin, and gelled by heating it at 180° C. for 5 minutes in a hot air dryer to form a semisol cast film having a thickness of 50 microns. The resulting film was tested for the properties described above. The results are shown in Table 4-b.

TABLE 1

| | Polyester plasticizers | | |
| --- | --- | --- | --- |
| Designation | Number average molecular weight (Mn) | Tradename | Used in |
| A | About 2,000 | PM-446 (Adeka-Argus Chemical Co., Ltd.) | Examples 1, 5, 6, 7, 8 and 9 and Comparative Examples 5, 6, 7, 8 and 9 |
| B | About 3,800 | NS-3700 (Dainichi Seika Industry Co., Ltd.) | Examples 2, 3, 4, 10, 11, 12, and 13 and Comparative Examples 3, 4, and 10 |
| C | About 1,000 | PN-150 (Adeka-Argus Chemical Co., Ltd.) | Comparative Example 1 |

The number average molecular weights ($\overline{Mn}$) given above were measured by an instrument (Model HLC102A made by Toyo Soda Industry Co., Ltd.) in accordance with the gel-permation chromatographic method involving calculation for standard polystyrene.

Referential Example

Synthetic of acrylic or methacrylic resins:

One hundred parts by weight of toluene was put in a reactor equipped with dropping devices, a stirrer and a reflux condenser, and with stirring, the temperature was raised to 90° C. A mixture composed of 95 parts by weight of BMA, 3 parts by weight of AN, 2 parts by weight of MAA and 1.5 parts by weight of laurylmercaptan and a mixture composed of 15 parts by weight of toluene and 5 parts by weight of perbutyl PV (a product of Nihon Oils and Fats Co., Ltd.) were continuously added dropwise from separate dropping devices over the course of about 2 hours. The reaction was continued for 1 hour. The resulting resin solution was concentrated in vacuum to obtain a solid copolymer having a volatile content of 1.5%. This copolymer had a number average molecular weight ($\overline{M}n$) of 9400. It is designatd as "AC-1".

Acrylic or methacrylic resins were prepared by performing the polymerization in the same way as above except that the monomer composition was changed as shown in Table 2, and the reaction temperature, the solvent, the polymerization degree adjusting agent and the catalyst as shown in Table 3. The resulting resins are designated as AC-2 to AC-7.

TABLE 2

| Resin No. | Composition (wt. %) | Number average molecular weight (Mn) | Glass transition temperature (Tg, °C.) | Property (23° C.) |
|---|---|---|---|---|
| | Acrylic or methacrylic resin | | | |
| AC-1 | BMA-AN-BAA 95 3 2 | 9,400 | 28.5 | Solid |
| AC-2 | EMA-MA-2EHA 75 15 10 | 2,350 | 34.0 | Solid |
| AC-3 | MMA-BMA-BA 60 30 10 | 15,200 | 52.0 | Solid |
| AC-4 | MMA 100 | 35,100 | 103.0 | Solid |
| AC-5 | MMA-BA 85 15 | 61,500 | 65.0 | Solid |
| AC-6 | MMA-BMA 90 10 | 880 | 92.0 | Solid |
| AC-7 | MMA-BMA 75 25 | 9,300 | 78.5 | Solid |

TABLE 3

| Resin No. | Reaction temperature (°C.) | Solvent | Type and amount of the polymerization degree adjusting agent | Type and amount of the catalyst |
|---|---|---|---|---|
| AC-1 | 90 | Toluene | Laurylmercaptan (1.5 parts by weight) | Perbutyl PV (5.0 parts by weight) |
| AC-2 | 90 | Toluene | Laurylmercaptan (6.0 parts by weight) | Perbutyl PV (3.0 parts by weight) |
| AC-3 | 90 | Toluene | Laurylmercaptan (0.5 part by weight) | Perbutyl PV (2.0 parts by weight) |
| AC-4 | 80 | Toluene | Laurylmercaptan (0.3 part by weight) | Benzoyl peroxide (0.4 part by weight) |
| AC-5 | 80 | Toluene | None | Benzoyl peroxide (0.4 part by weight) |
| AC-6 | 110 | Ethyl Cellosolve | 2-Mercaptoethanol (7.0 parts by weight) | Perbutyl PV (5.0 parts by weight) |
| AC-7 | 90 | Methyl isobutyl ketone | Laurylmercaptan (0.8 part by weight) | Perbutyl PV (2.0 parts by weight) |

TABLE 4-a

| Example (Ex.) or Comparative Example (CEx.) | Amount of the vinyl chloride resin (parts by weight) | Polyester plasticizer Type | Polyester plasticizer Amount (parts by weight) | Acrylic or methacrylic resin Type | Acrylic or methacrylic resin Amount (wt. % based on the plasticizer) |
|---|---|---|---|---|---|
| CEx. 1 | 100 | C | 40 | AC-1 | 50 |
| Ex. 1 | 100 | A | 40 | AC-1 | 50 |
| Ex. 2 | 100 | B | 40 | AC-1 | 50 |
| CEx. 3 | 100 | B | 5 | AC-1 | 120 |
| EX. 3 | 100 | B | 40 | AC-1 | 120 |
| Ex. 4 | 100 | B | 60 | AC-1 | 120 |
| CEx. 4 | 100 | B | 90 | AC-1 | 120 |
| CEx. 5 | 100 | A | 40 | AC-6 | 50 |
| Ex. 5 | 100 | A | 40 | AC-2 | 50 |
| Ex. 6 | 100 | A | 40 | AC-4 | 50 |
| CEx. 6 | 100 | A | 40 | AC-5 | 50 |
| CEx. 7 | 100 | A | 40 | AC-1 | 0.1 |
| Ex. 7 | 100 | A | 40 | AC-1 | 10 |
| Ex. 8 | 100 | A | 40 | AC-1 | 150 |
| CEx. 8 | 100 | A | 40 | AC-1 | 250 |
| Ex. 9 | 100 | B | 35 | AC-7 | 40 |
| CEx. 9 | 100 | B | 90 | AC-7 | 50 |

TABLE 4-b

| Example (Ex.) or Comparative Example (CEx.) | Yield stress (kg/mm²) | Elongation (%) | Adhesion strength retention (%) | Ultraviolet absorber retention (%) | Printing ink adhesion (grade) | Weatherabilty (grade) | Whitening by water absorption (grade) |
|---|---|---|---|---|---|---|---|
| CEx. 1 | 0 | 290 | 43 | 58 | 2 | 1 | 4 |
| Ex. 1 | 2.2 | 280 | 85 | 90 | 10 | 4 | 5 |
| Ex. 2 | 2.7 | 230 | 93 | 92 | 10 | 5 | 4 |
| CEx. 3 | 5.3 | 7 | 91 | 67 | 7 | 4 | 4 |
| EX. 3 | 3.7 | 265 | 97 | 93 | 10 | 5 | 4 |
| Ex. 4 | 3.1 | 295 | 89 | 91 | 10 | 4 | 4 |
| CEx. 4 | 0 | 330 | 12 | 61 | 2 | 1 | 3 |
| CEx. 5 | 0 | 320 | 53 | 65 | 3 | 2 | 3 |

TABLE 4-b-continued

| Example (Ex.) or Comparative Example (CEx.) | Yield stress (kg/mm²) | Elongation (%) | Adhesion strength retention (%) | Ultraviolet absorber retention (%) | Printing ink adhesion (grade) | Weather-abilty (grade) | Whitening by water absorption (grade) |
| --- | --- | --- | --- | --- | --- | --- | --- |
| Ex. 5  | 2.3 | 270 | 82 | 88 | 9  | 4 | 5 |
| Ex. 6  | 3.3 | 200 | 97 | 95 | 10 | 5 | 4 |
| CEx. 6 | 5.8 | 8   | 93 | 60 | 8  | 3 | 2 |
| CEx. 7 | 0   | 300 | 21 | 45 | 3  | 2 | 2 |
| Ex. 7  | 1.8 | 305 | 75 | 80 | 9  | 5 | 4 |
| Ex. 8  | 3.5 | 250 | 95 | 94 | 9  | 5 | 5 |
| CEx. 8 | 5.5 | 6   | 88 | 90 | 7  | 4 | 4 |
| Ex. 9  | 3.2 | 245 | 96 | 93 | 10 | 5 | 5 |
| CEx. 9 | 0   | 340 | 49 | 64 | 3  | 3 | 3 |

EXAMPLES 10 AND 11 AND COMPARATIVE EXAMPLES 10 AND 11

In each run, a composition composed of each of the vinyl chloride resins, each of the polyester plasticizers and each of the acrylic or methacrylic resins shown in Table 5-a in the amounts indicated there, and per 100 parts by weight of the vinyl chloride resin, 3 parts by weight of DIDA (diisodecyl adipate, a product of Mitsubishi-Monsanto Chemical Co., Ltd.) (in Example 10 and Comparative Example 10) or 3 parts by weight of DOP (dioctyl phthalate, a product of Mitsubishi-Monsanto Chemical Co., Ltd.) (in Example 11 and Comparative Example 11) and containing the same additives as in Example 1 was molded into a film in the same way as in Example 1. The film was tested for the properties described above, and the results are shown in Table 5-b.

EXAMPLE 12

A composition composd of the polyester plasticizer and the acrylic resin shown in Table 5-a in the amounts indicated and further comprising the same components as the composition used in Example 1 except that the vinyl chloride resin was changed to Zeon 135J (a product of Nihon Zeon Co., Ltd.; degree of polymerization about 1200, containing vinyl chloroacetate having a vinyl acetate content of about 5%) was molded into a film in the same way as in Example 1. The film was tested for the properties described above, and the results are shown in Table 5-b.

EXAMPLE 13

The same composition as in Example 1 except that it contained the vinyl chloride resin (Zeon 121, a product of Nihon Zeon Co., Ltd., average degree of polymerization about 1,500), the polyester plasticizer and the acrylic resin shown in Table 5-a in the amounts indicated there, and a liquid ultraviolet absorber UVINAL-N-539 (a tradename for a product of General Aniline Corp., coagulation point −10° C.) was molded into a film in the same way as in Example 1. The resulting film was tested for the properties described hereinabove.

EXAMPLE 14

The same composition as used in Example 1 except that it contained the vinyl chloride resin, the polyester plasticizer and the acrylic resin shown in Table 5-a in the amounts indicated there was molded into a film in the same way as in Example 1. The film was tested for the properties described hereinabove. The results are shown in Table 5-b.

TABLE 5-a

| Example (Ex.) or Comparative Example (CEx.) | Vinyl chloride resin | | Polyester plasticizer | | Other plastics | | Acrylic or methacrylic resin | |
| --- | --- | --- | --- | --- | --- | --- | --- | --- |
| | Degree of polymerization | Parts by weight | Type | Parts by weight | Type | Parts by weight | Type | Amount (wt. %) based on the plasticizer |
| CEx. 10 | 1500 | 100 | A | 30 | DIDA | 10 | AC-2 | 120 |
| Ex. 10  | 1500 | 100 | A | 37 | DIDA | 3  | AC-2 | 120 |
| Ex. 11  | 1500 | 100 | B | 37 | DOP  | 3  | AC-4 | 50 |
| CEx. 11 | 1500 | 100 | B | 40 | DOP  | 10 | AC-4 | 50 |
| EX. 12  | 1200 (Vinyl acetate about 5%) | 100 | B | 40 | — | — | AC-4 | 50 |
| EX. 13  | 1500 | 100 | B | 40 | — | — | AC-4 | 50 |
| Ex. 14  | 1500 | 100 | B | 40 | — | — | AC-3 | 50 |

TABLE 5-b

| Example (Ex.) or Comparative Example (CEx.) | Yield stress (kg/mm²) | Elongation (%) | Adhesion strength retention (%) | Ultraviolet absorber retention (%) | Printing ink adhesion (grade) | Weather-abilty (grade) | Whitening by water absorption (grade) |
| --- | --- | --- | --- | --- | --- | --- | --- |
| CEx. 10 | 0   | 250  | 15 | 60 | 2  | 3 | 4 |
| Ex. 10  | 2.1 | 220  | 83 | 89 | 9  | 5 | 4 |
| Ex. 11  | 2.0 | 240  | 82 | 87 | 9  | 5 | 4 |
| CEx. 11 | 0   | 270  | 10 | 55 | 3  | 2 | 1 |
| EX. 12  | 2.3 | 230  | 91 | 91 | 10 | 5 | 4 |
| Ex. 13  | 2.2 | 230  | 92 | 84 | 10 | 5 | 4 |
| Ex. 14  | 2.1 | 26.5 | 98 | 93 | 10 | 5 | 4 |

We claim:

1. A vinyl chloride resin composition with a yield stress of 1 to 5 g/mm², composed of
    (A) 100 parts by weight of a vinyl chloride paste resin having a degree of polymerization of about 600 to about 3,000, containing 0 to 20% by weight of a comonomer, (B) about 10 to about 80 parts by weight, per 100 parts by weight of the resin (A), of (B-1) a liquid polyester plasticizer having a number average molecular weight ($\overline{M}n$) of about 1,500 to about 6,000 and 0 to about 10 parts by weight per 100 parts by weight of the resin (A), of (B-2) a plasticizer for the resin (A), which is derived from a $C_4$–$C_{15}$ dibasic acid and a $C_2$–$C_{20}$ glycol, and (C) about 0.2 to about 200% by weight, based on the total weight of said plasticizers (B-1) and (B-2), of a low-molecular-weight acrylic or methacrylic resin which may contain not more than about 60 parts by weight, per 100 parts by weight of the acrylic or methacrylic acid ester, of a comonomer component other than the acrylic or methacrylic acid ester, said resin having a number average molecular weight ($\overline{M}n$) of about 2,000 to about 40,000 and being solid at 23° C.

2. The resin composition of claim 1 wherein the comonomer in the vinyl chloride resin (A) is selected from the group consisting of olefins, dienes, vinyl or vinylidene halides other than vinyl chloride, arcylic or methacrylic acid esters, vinyl esters, vinyl ethers, styrene and styrene derivatives.

3. The resin composition of claim 1 wherein the plasticizer (B-2) is selected from the group consisting of mono- or polyesters of $C_1$–$C_{35}$ monohydric or polyhydric alcohols with $C_1$–$C_{35}$ mono- or poly-basic acids, fatty acid derivatives, sulfonic acid derivatives, phosphoric acid derivatives, pyromellitic acid derivatives, glycol derivatives, glycerol derivatives, paraffin derivatives and epoxy derivatives.

4. The resin composition of claim 1 which is in the form of a film.

5. The resin composition of claim 1 which is in the form of a marking film.

6. The resin composition of claim 1 which further comprises an ultraviolet absorber.

7. The resin composition of clailm 6 wherein the ultraviolet absorber is a liquid ultraviolet absorber.

8. The resin composition of claim 1 which has a yield stress of 1.2 to 4 kg/mm$^2$.

9. The resin composition of claim 1 wherein the vinyl chloride resin (A) is a vinyl chloride paste resin.

10. The resin composition of claim 4 which further comprises an ultraviolet absorber.

11. The resin composition of claim 1 wherein the comonomer component (C), other than the acrylic or methacrylic acid ester, is selected from the group consisting of propylene, butylene, isobutylene, 4 methyl-1-pentene, butadiene, chlorobutadiene, pentadiene, vinyl acetate, vinyl chloroacetate, vinyl propionate, vinyl laurate, vinyl chloride, vinylidene chloride, methyl vinyl ether, propyl vinyl ether, butyl vinyl ether, phenyl vinyl ether, styrene methylstyrene, dimethylstyrene, vinylphenol, maleic acid, fumaric acid, crotonic acid, acrylic acid, methacrylic acid, itaconic acid, acryloyl choride, acrylonitrile, acrylamide and N-tert-butylacrylamides.

* * * * *